(12) United States Patent
Parampottil et al.

(10) Patent No.: US 11,800,365 B1
(45) Date of Patent: Oct. 24, 2023

(54) AUTHORIZED USE OF PERSONAL CONTROLLED-ENVIRONMENT FACILITY RESIDENT COMMUNICATION AND/OR MEDIA DEVICES BY DEVICE LOCATION ELIGIBILITY

(71) Applicant: Securus Technologies, LLC, Carrollton, TX (US)

(72) Inventors: Isaac Parampottil, Coppell, TX (US); Connor Pickens, Little Elm, TX (US); Alice J. Clements, Coppell, TX (US)

(73) Assignee: Securus Technologies, LLC, Carrollton, TX (US)

( * ) Notice: Subject to any disclaimer, the term of this patent is extended or adjusted under 35 U.S.C. 154(b) by 268 days.

(21) Appl. No.: 17/122,533

(22) Filed: Dec. 15, 2020

(51) Int. Cl.
| | |
|---|---|
| *H04W 12/63* | (2021.01) |
| *H04W 12/30* | (2021.01) |
| *G06F 21/35* | (2013.01) |
| *G06F 21/44* | (2013.01) |
| *H04W 12/40* | (2021.01) |

(52) U.S. Cl.
CPC ............ *H04W 12/63* (2021.01); *G06F 21/35* (2013.01); *G06F 21/44* (2013.01); *H04W 12/40* (2021.01)

(58) Field of Classification Search
CPC ....... H04W 12/63; H04W 12/40; G06F 21/35; G06F 21/44
See application file for complete search history.

(56) References Cited

U.S. PATENT DOCUMENTS

| | | | |
|---|---|---|---|
| 2006/0099965 A1* | 5/2006 | Aaron | H04W 12/64 455/420 |
| 2007/0129012 A1 | 6/2007 | Snow | |
| 2008/0160984 A1 | 7/2008 | Benes et al. | |
| 2010/0130178 A1* | 5/2010 | Bennett | H04W 12/082 455/414.1 |
| 2011/0305337 A1* | 12/2011 | Devol | G06F 21/552 726/16 |

(Continued)

OTHER PUBLICATIONS

Palacios, J., Casari, P., & Widmer, J. (2017, May). JADE: Zero-knowledge device localization and environment mapping for millimeter wave systems. In IEEE Infocom 2017—IEEE Conference on Computer Communications (pp. 1-9). IEEE (Year: 2017).*

*Primary Examiner* — Catherine Thiaw
(74) *Attorney, Agent, or Firm* — Fogarty LLP

(57) ABSTRACT

In embodiments for authorized use of personal controlled-environment facility resident communication and/or media devices by device location eligibility within a controlled-environment facility, each resident device, itself, determines whether the device is authorized to operate within a particular area within the facility that the device is entering or attempting to operate in, and/or whether the device is authorized to operate one or more particular application programs (apps) and/or device functions within the particular area. The device, itself, allows operation of the device, and/or allows operation of the particular app(s) and/or device functions, in response to a determination that the device is authorized to do so within the particular area. However, the device, itself, suspends its operation, and/or operation of the particular app(s) and/or device functions, in response to a determination that the device is not authorized to itself operate, or operate the app(s) and/or device functions, within the particular area.

18 Claims, 4 Drawing Sheets

(56) References Cited

U.S. PATENT DOCUMENTS

| | | |
|---|---|---|
| 2012/0322370 A1 | 12/2012 | Lee |
| 2014/0194084 A1 | 7/2014 | Noonan et al. |
| 2015/0050922 A1 | 2/2015 | Ramalingam et al. |
| 2015/0219749 A1* | 8/2015 | Dua .................. G01S 5/10 455/456.1 |
| 2015/0381610 A1* | 12/2015 | Poornachandran .................... H04W 12/069 726/20 |
| 2017/0041345 A1* | 2/2017 | Mandalia ............. H04W 12/06 |
| 2017/0093919 A1* | 3/2017 | Pramanik ............. G06F 21/305 |
| 2018/0176366 A1 | 6/2018 | Mukherjee |
| 2018/0206069 A1 | 7/2018 | Santos |
| 2019/0364380 A1* | 11/2019 | Khawand ............ H04B 17/318 |
| 2021/0126912 A1* | 4/2021 | MacLean ............. H04W 12/63 |
| 2021/0227383 A1* | 7/2021 | Alameh ............... H04W 12/02 |
| 2022/0109983 A1* | 4/2022 | Barkam ............... H04W 4/029 |

* cited by examiner

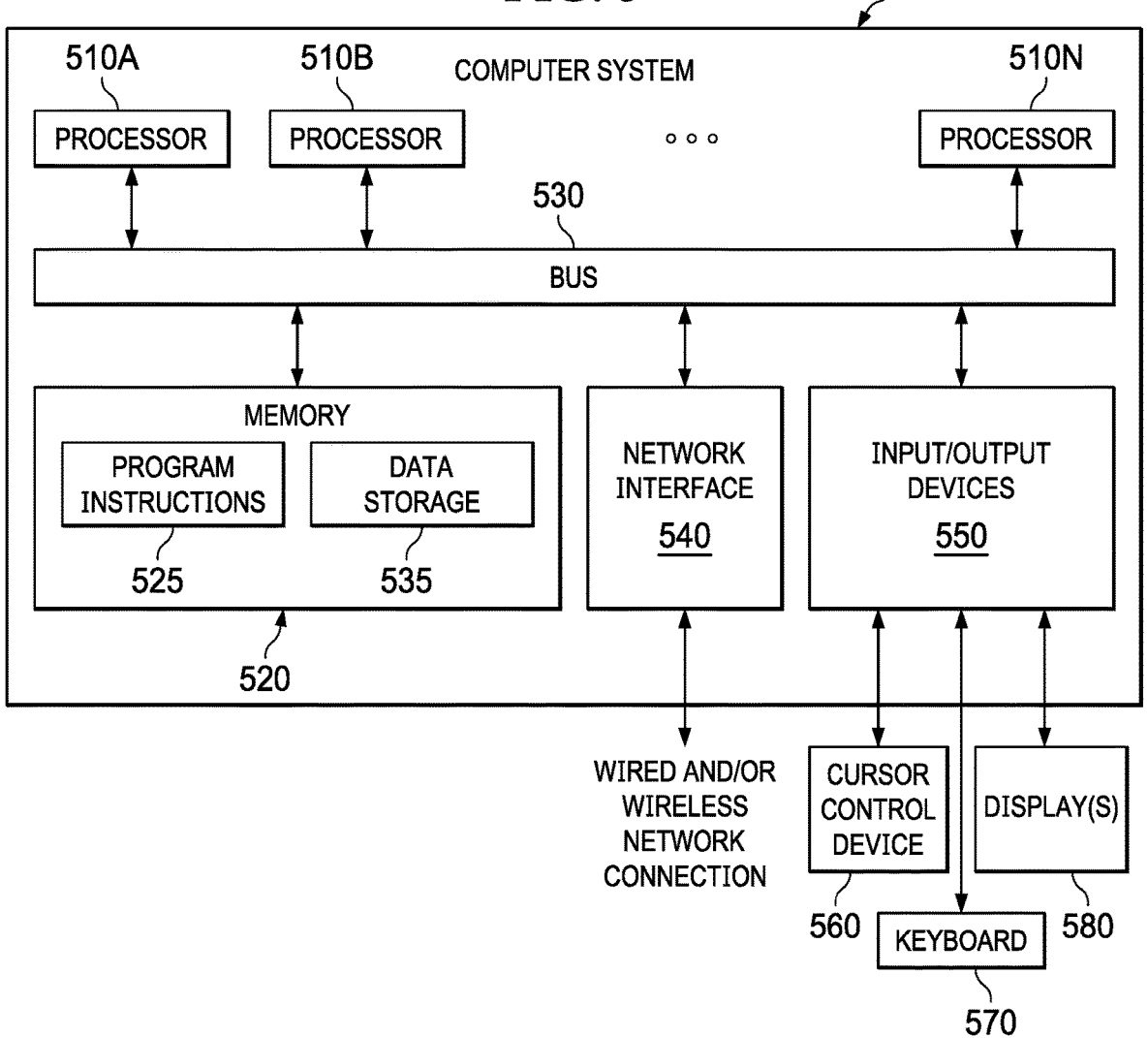

AUTHORIZED USE OF PERSONAL CONTROLLED-ENVIRONMENT FACILITY RESIDENT COMMUNICATION AND/OR MEDIA DEVICES BY DEVICE LOCATION ELIGIBILITY

TECHNICAL FIELD

This disclosure is related to use of personal controlled-environment facility resident communication and/or media devices communications by residents of controlled-environment facilities, specifically to safe and secure use of personal controlled-environment facility resident communication and/or media devices controlled-environment facility residents, and particularly to authorizing use of personal controlled-environment facility resident communication and/or media devices by device location eligibility within the controlled-environment facility.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident. However, unrestricted access to wireless communication systems is not typically desirable for security or privacy reasons. For example, video communications pose particular issues due to privacy of other residents and may need to be restricted even more than other types of communication.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to sufficiently monitor communications of their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide authorized use of personal controlled-environment facility resident communication and/or media devices by device location eligibility within a controlled-environment facility. Personal controlled-environment facility resident communication and/or media devices deployed within a controlled-environment facility may each, itself, determine whether the resident device is authorized to operate within a particular area within the controlled-environment facility that the device is entering or attempting to operate in, and/or whether the resident device authorized to operate one or more particular application programs (apps) and/or device functions within the particular area. The resident device, itself, may allow operation of the device, in response to a determination that the device is authorized to operate within the particular area and/or may allow operation of the one or more particular apps and/or device functions operating on the resident device, in response to a determination that the resident device is authorized to operate the particular app(s) and/or device functions within the particular area. However, the resident device, may, itself suspend its operation, in response to a determination that the resident device is not authorized to operate within the particular area, and/or may suspend operation of the particular app(s) and/or device functions, in response to a determination that the resident device is not authorized to operate the particular app(s) and/or device functions within the particular area.

In some implementations, the personal controlled-environment facility resident communication and/or media devices may determine when the respective resident device moves out of the particular area, and determine, in response thereto, whether the resident device is authorized to operate outside the particular area within the controlled-environment facility and/or authorized to operate particular app(s) and/or device functions, within the controlled-environment facility, outside the particular area. The resident device may, itself, allow operation of the resident device and may allow operation of the particular app(s) and/or device functions on the resident device, in response to a determination that the resident device is exiting or outside of the particular area and in response to a determination that the resident device is authorized to operate the particular app(s) and/or device functions outside the particular area. Conversely, the resident device may, itself, suspend operation, in response to a determination that the resident device is not authorized to operate outside the particular area, and/or suspend operation of the particular app(s) and/or device functions, in response to a determination that the resident device is not authorized to operate the particular app(s) and/or device functions outside the particular area.

In accordance with implementations of the present systems and methods, one or more wireless network access points may be deployed for wireless data communication with personal controlled-environment facility resident communication and/or media devices, such that a range of each of at least some of the wireless network access points define one particular area within the controlled-environment facility. Additionally, or alternatively, one or more respective pairs of wireless location points, in wireless data communication with the resident device(s), may be deployed such that each respective pair of wireless location points define a boundary of one particular area within the controlled-environment facility.

In some implementations, each resident device may include an identification apparatus, and device identification apparatus interrogators and/or readers may be disposed within some areas defined within the controlled-environment facility, configured to identify, recognize, or otherwise read the device identification apparatus. In such implementations the personal controlled-environment facility resident communication and/or media devices may allow operation of the resident device, in response to the device identification apparatus interrogator and/or reader disposed within the particular area (also) recognizing the resident device as authorized to operate within the particular area, and allow operation of the particular app(s) and/or device functions operating on the resident device, in response to the device identification apparatus interrogator and/or reader disposed within the particular area (also) recognizing the resident device as authorized to operate the particular app(s) and/or device functions within the particular area. Conversely, the resident device may, itself, suspend operation, in response to the device identification apparatus interrogator and/or reader disposed within the particular area not recognizing the resident device as authorized to operate within the particular area, and suspend operation of the particular app(s) and/or device functions, in response to the device identification apparatus interrogator and/or reader disposed within the particular area not recognizing the resident device as authorized to operate the particular app(s) and/or device functions within the particular area.

However, in other implementations, where each resident device includes an identification apparatus and device identification apparatus interrogators and/or readers are disposed within areas defined within the facility, the resident devices may, themselves, allow operation of the resident device, in response to the device identification apparatus interrogator and/or reader disposed within the particular area not recognizing the resident device as within the particular area and/or allow operation of the particular app(s) and/or device functions operating on the resident device, in response to the device identification apparatus interrogator and/or reader disposed within the particular area not recognizing the resident device as within the particular area. Also in such other implementations, the resident device may, itself, suspend operation, in response to the device identification apparatus interrogator and/or reader disposed within the particular area recognizing the resident device as within the particular area, and suspend operation of the particular app(s) and/or device functions, in response to the device identification apparatus interrogator and/or reader disposed within the particular area recognizing the resident device as within the particular area.

In various implementations of the present systems and methods each resident device may also alert a (resident) user of the resident device that operation of the resident device is being suspended and/or operation of the particular app(s) and/or device functions is, or are being, suspended. Also, each resident device may also alert (a) user(s) of (a) personal controlled-environment facility personnel communication and/or media device(s) that operation of the resident device is suspended and/or operation of the particular app(s) and/or device functions of the resident device is suspended. Such alerts may identify the particular area where the suspension of operation(s) is taking place.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
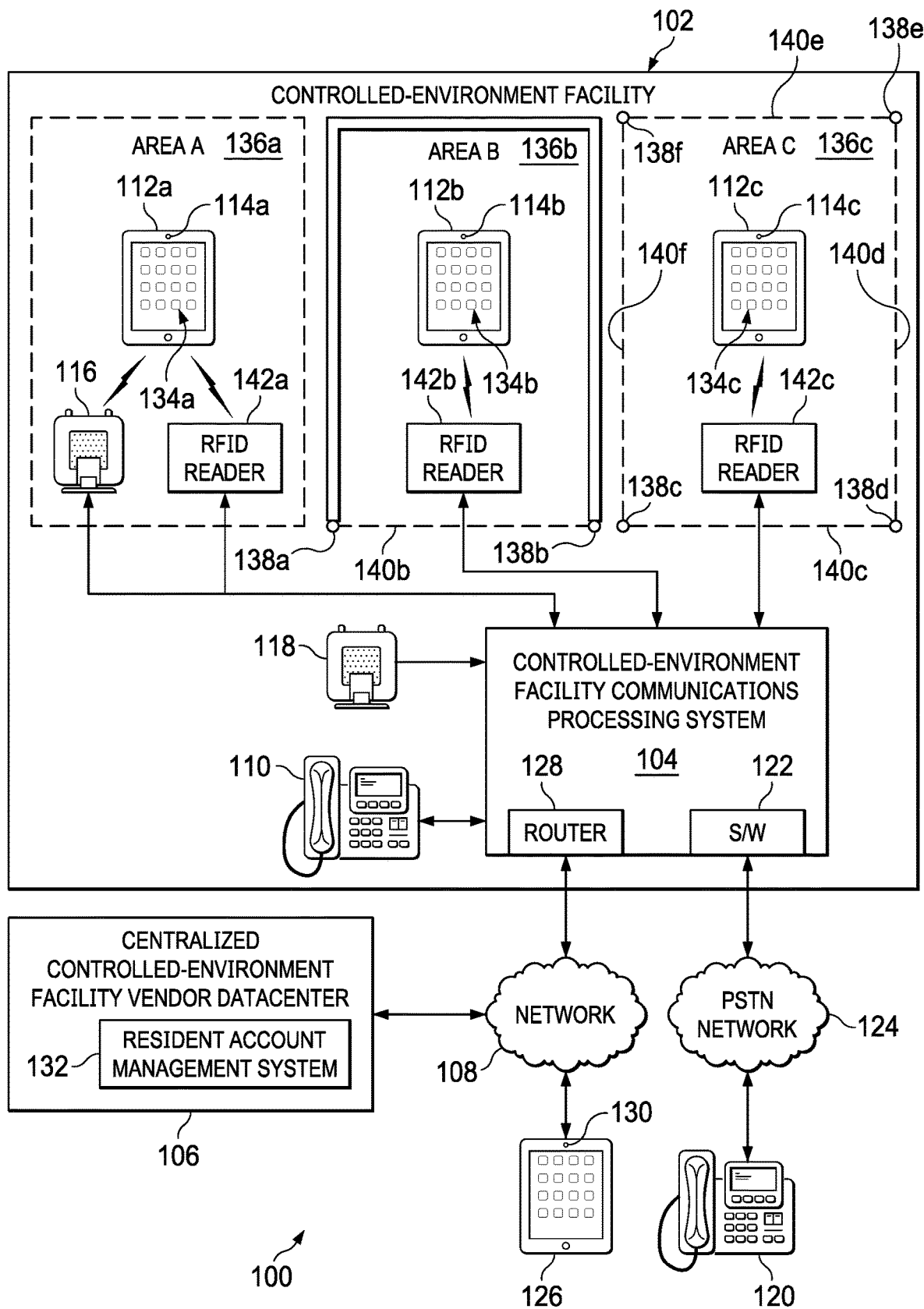
Figure 2:
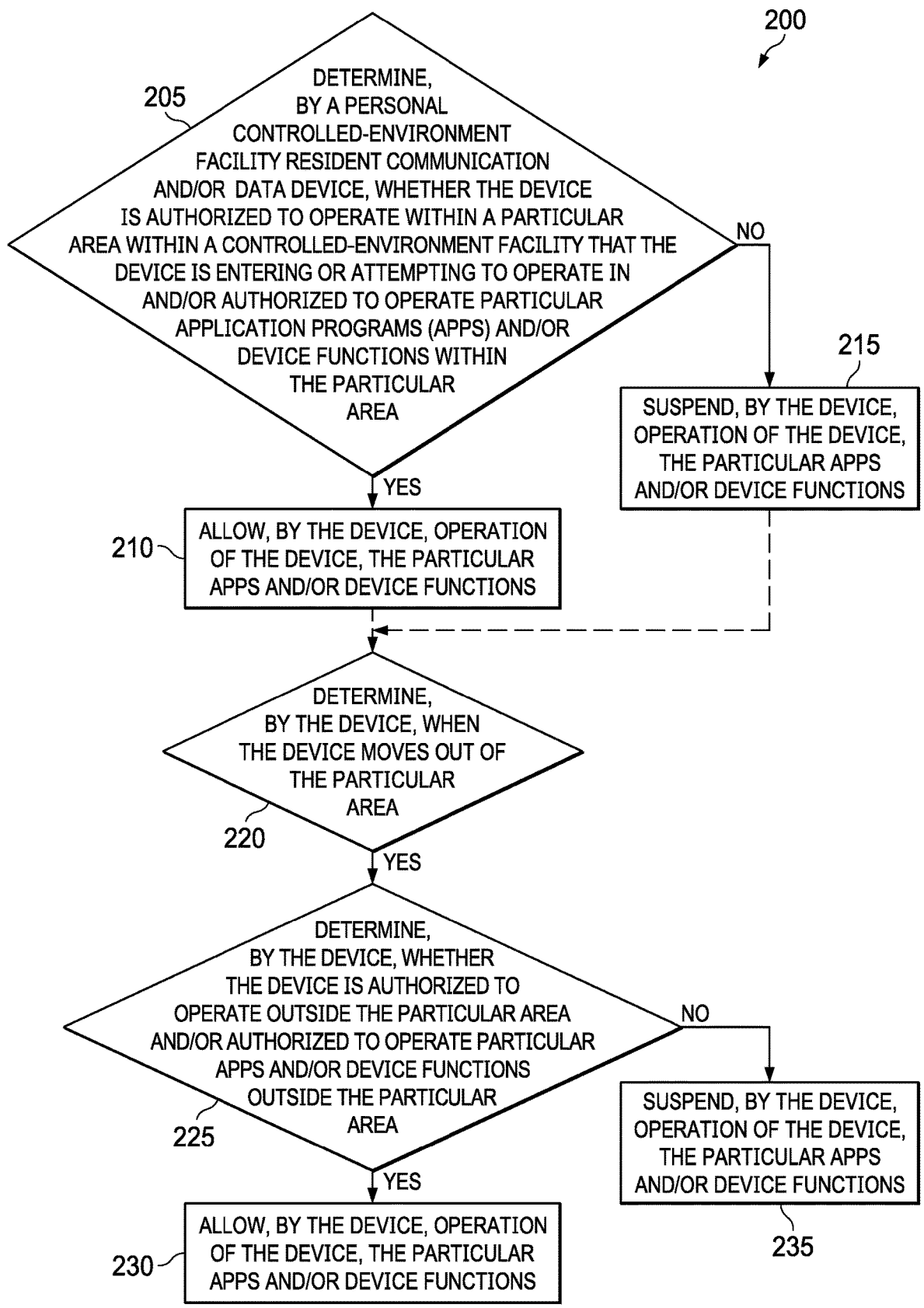
Figure 3:
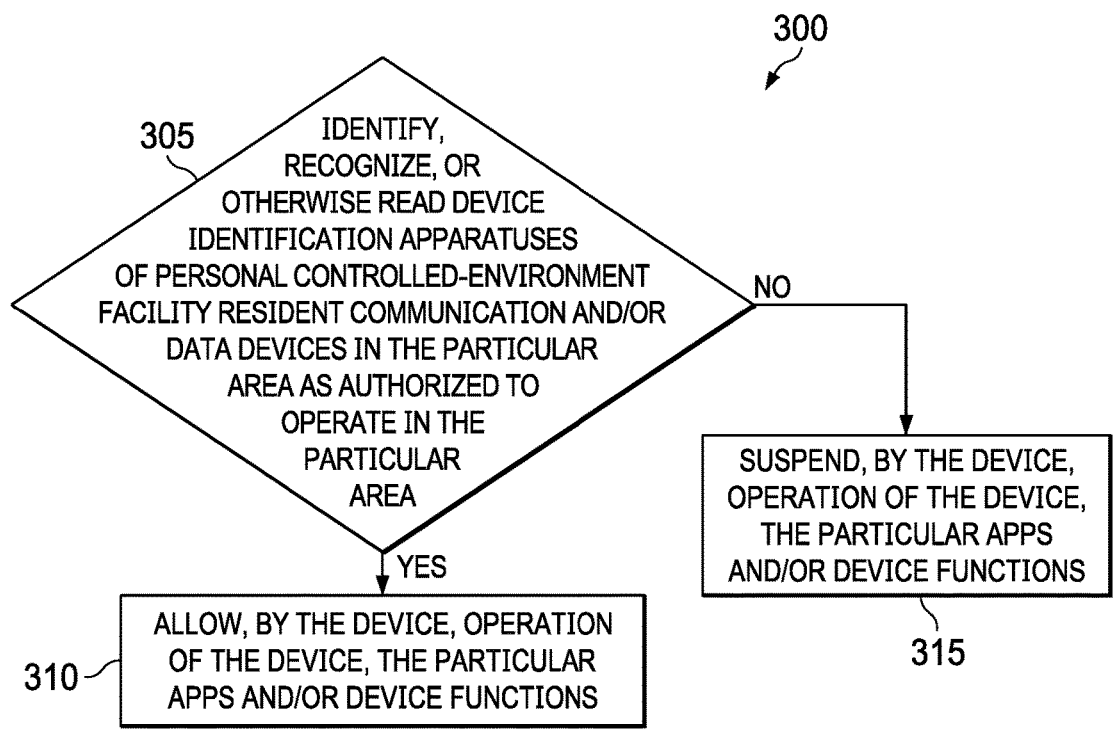
Figure 4:
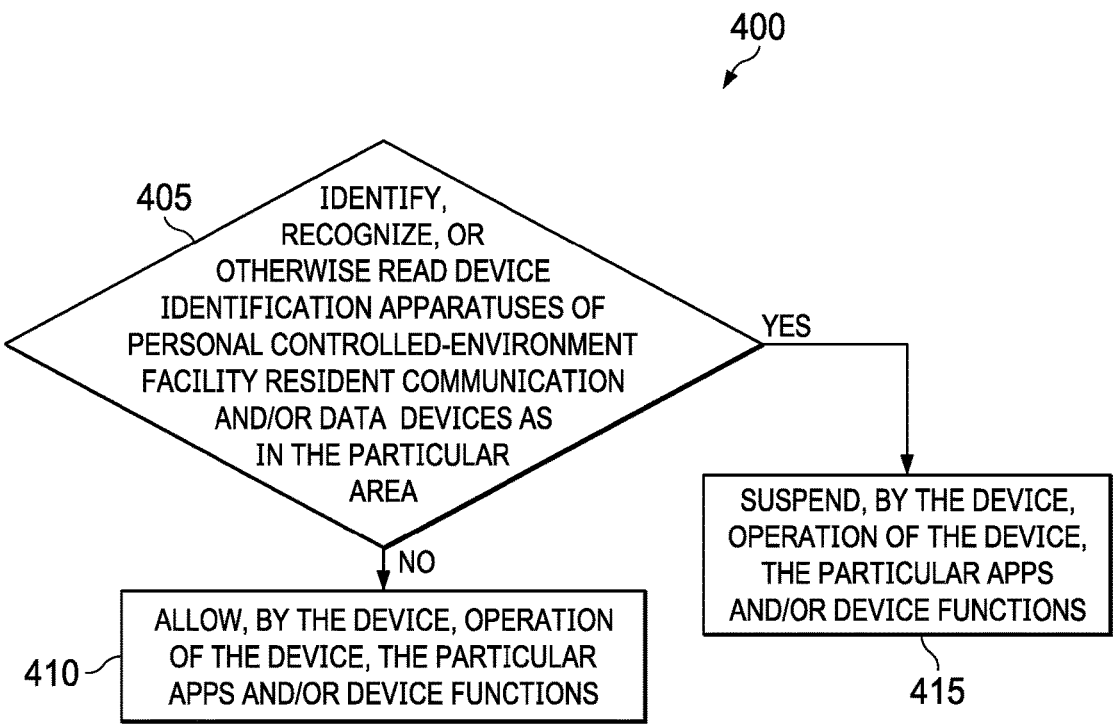

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for authorized use of personal controlled-environment facility resident communication and/or media devices by device location eligibility may be deployed or otherwise employed, according to some embodiments;

FIG. 2 is a flowchart of an example process for authorizing use of personal controlled-environment facility resident communication and/or media devices by device location eligibility, in accordance with some embodiments;

FIG. 3 is a flowchart of a further example process for further authorizing use of personal controlled-environment facility resident communication and/or media devices by device location eligibility, in accordance with some embodiments;

FIG. 4 is a flowchart of further example process 400 for further authorizing use of personal controlled-environment facility resident communication and/or media devices (112) by device location eligibility, in accordance with some embodiments of the present systems and methods; and FIG. 5 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present system and methods are related to use of personal controlled-environment facility resident communication and/or media devices communications by residents of controlled-environment facilities, specifically to safe and secure use of personal controlled-environment facility resident communication and/or media devices controlled-environment facility residents, and particularly to authorizing use of personal controlled-environment facility resident communication and/or media devices by device location eligibility within the controlled-environment facility. In embodiments of the present systems and methods for authorized use of personal controlled-environment facility resident communication and/or media devices by device location eligibility within a controlled-environment facility, each resident device, itself, may determine whether the device is authorized to operate within a particular area of (within) the facility that the device is entering or attempting to operate in, and/or whether the device is authorized to operate one or more particular application programs (apps) and/or device functions within the particular area. The device, itself, may allow operation of the device, and/or may allow operation of the particular app(s) and/or device functions, in response to a determination that the device is authorized to do so within that particular area. However, the device, itself, may, conversely, suspend its operation, and/or operation of the particular app(s) and/or device functions, in response to a determination that the device is not authorized to itself operate, or operate the app(s) and/or device functions, within the particular area.

Thereby, embodiments of the present systems and methods make personal controlled-environment facility resident communication and/or media devices eligible for use by device. An identification apparatus, such as a radio frequency identification (RFID) tag, chip, or the like, incorporated into the device may (also) be used, such that an authorized user may use their personal controlled-environment facility resident communication and/or media device in defined areas. Such areas may be defined by wireless network access points and/or with area boundaries created by location points, but not use the device outside such areas. Conversely, in some embodiments defined areas may act as exclusion zones, where the device may only be used outside such areas.

FIG. 1 is a diagrammatic illustration of example communications environment 100, wherein an example embodiment of the present systems and methods for authorized use of personal controlled-environment facility resident communication and/or media devices by device location eligibility may be deployed or otherwise employed, with respect to controlled-environment facility 102, according to some embodiments. Controlled-environment facility communications processing system 104 may provide telephone services, videoconferencing, online chat, and other communication services to residents of controlled-environment facility 102. In some cases, such as illustrated, controlled-environment facility communications processing system 104 may be co-located with controlled-environment facility 102. Alternatively, or additionally, an external centralized communications processing system may be deployed in a (centralized) controlled-environment facility vendor (e.g. a controlled-environment facility communications provider) datacenter 106, or the like. That is, controlled-environment facility communications processing system 104 may be centrally and/or remotely located with respect to one or more controlled-environment facilities and/or may provide communication services to multiple controlled-environment facilities, in which case, controlled-environment facility 104 is illustrated as one example. Such a controlled-environment facility vendor datacenter may be connected to such facilities via a public network (e.g. the Internet) or a private network (e.g. intranet) 108, or the like (e.g. via a secure tunneling protocol over the internet, using encapsulation). More generally, however, it should be noted that controlled-environment facility communications processing system 104 may assume a variety of forms, including telephony switches such as electronic switching systems, or the like, and/or and may be configured to serve a variety of facilities and/or users, whether within or outside of a controlled-environment facility.

Residents may use more-or-less conventional telephones 110 to access certain communication services. However, in accordance with embodiments of the present systems and methods, residents may also, or alternatively, use personal controlled-environment facility communication and/or media devices 112a through 112c, referred to herein collectively or individually as Intelligent Resident Device(s) (IRD(s)) 112, or the like. For example, a resident may use personal controlled-environment facility communication and/or media device 112, or the like, to place voice calls, as well as for video communication. Such a personal controlled-environment facility communication and/or media device 112 may be a personal computer wireless device, such as a tablet computing device or smartphone (112), which may have been adapted and/or approved for use in controlled-environment facility 102, may be used by controlled-environment facility residents for communication. Such a personal resident device may be referred to as the aforementioned Intelligent Resident Device (IRD), or the like, in controlled-environment facilities, in general and/or referred to as an Intelligent Inmate Device (IID) in a correctional institution environment.

As will be appreciated, IRD 112, or other similar devices may have video conferencing capabilities, or the like, such as front-facing camera 114a-c and a microphone, to enable a party to participate in video communication sessions with other call parties, such as non-residents of the controlled-environment facility, via video communication, secure online chat, etc.

Controlled-environment facility personnel, such as correctional facility corrections officers, may, in the performance of their duties, employ personal wireless devices, such as tablet computing devices or smartphones. Regardless, such controlled-environment facility personnel devices, other controlled-environment facility personnel devices or terminals, IRDs, IIDs, etc. may be generally referred to herein as "personal controlled-environment facility communication and/or media devices," or the like.

As noted, IRDs 112 may be tablet computing devices, smartphones, media players, or the like adapted and/or approved for use by residents of the controlled-environment facility (within the controlled-environment facility). Each IRD 112 may be particularly adapted for use in a controlled-environment. For example, in a correctional institution, jail, or the like, such an IRD, or IID, may have a specially adapted operating system and/or may be "stripped-down," particularly from the standpoint of what application programs (apps) and/or hardware are provided or allowed on IRD 112, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wireless Local Area Network (WLAN) access, or the like, only being available in certain areas. That is, for example, where streaming and/or downloading may be compartmentalized, leveraging the structure of the controlled-environment facility, for example, limiting the availability of a WLAN signal, providing the stream through the placement of wireless access points 116 and/or 118, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, various functions, such as video functions, of IRDs 112 may be restricted to specific monitored and controlled areas within the controlled-environment facility. Further, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society. Also, in certain embodiments, particularly in a correctional facility environment, a tablet computing device such as IRD 112 may be mounted on a wall, in a hardened case, as a community video communication device or Intelligent Facility Device (IFD).

Correctional facility corrections officers, or other controlled-environment facility personnel, may employ personal wireless devices, such as tablet computing devices or smartphones, in the performance of their duties. These personal controlled-environment facility personnel communication and/or media devices may be adapted in a manner similar to IRDs and/or IIDs 112, and/or otherwise approved, for use within the controlled-environment facility. However, such personal controlled-environment facility personnel communication and/or media devices may be adapted to prevent use by controlled-environment facility residents and/or to provide the controlled-environment facility personnel some degree of control over the IRDs, IIDs, or the like.

In accordance with embodiments of the present systems and methods, controlled-environment facility communication and/or media devices, 112, or the like, may present via a user interface, apps such as: a controlled-environment facility resident calling application, a video visitation application, a controlled-environment facility resident's manual, a controlled-environment facility resident form submittal program, a controlled-environment facility resident commissary ordering application, a music player, a video player, a web browser (which may be limited to only accessing secure websites and/or third party websites of approved vendors), a document reading program, an email application, a Prison Rape Elimination Act (PREA) information document, a PREA hotline, a legal research application, a job search application, a controlled-environment facility resident grievance submittal application, sick call app, education app, weather app, video mail, resident information app, games, a contacts functionality, and/or the like.

In various embodiments, to access communication services, a resident may initiate telephone services by lifting the receiver on telephone 110, and/or otherwise initiating a call, such as by launching a communications app on IRD 112. At which time, the resident may be prompted to provide a personal identification number (PIN), other identifying information or biometrics. An IVR unit (not shown, but which may be integrated into controlled-environment facility communications processing system 104) may generate and play a prompt, or other messages, to the resident on device 110, 112, or the like. Under the control of controlled-environment facility communications processing system 104, devices 110, 112, or the like may be capable of connecting to a non-resident's (i.e., a person not incarcerated or otherwise committed to a controlled-environment facility) telephone 112 across a Publicly Switched Telephone Network (PSTN) 124. For example, telephone 120 may be located at a non-resident's home or office, at a resident visitation center, etc. Switch 122, in controlled-environment facility communications processing system 104, may be used to connect calls across PSTN 124. Additionally, or alternatively, the non-resident may communicate using device 126, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 108. Router 128 of controlled-environment facility communications processing system 104 is used to route data packets associated with a call connection to device 126. For example, a non-resident party may have a device 126 with a built-in front-facing camera 130, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

In addition to providing certain visitation and communication operations, controlled-environment facility communications processing system 104 may ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in (a) database(s) maintained by controlled-environment facility vendor datacenter 106, and/or the like. In addition to PAC and/or PAN list(s), controlled-environment facility vendor datacenter 106, and/or the like, may also store Resident Profile Data (RPD), as well as communication and/or visitation rules applicable to each resident. This controlled-environment facility vendor datacenter 106 database(s), and/or the like may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 132, which may be a separate system, or which may be a part or function of controlled-environment facility vendor datacenter 106, as illustrated, may maintain resident accounts to the benefit of the respective resident, such as resident commissary accounts, resident communications accounts, which may be used to pay for purchase of a controlled-environment facility resident communication and/or media device (112) and/or accessories therefor, communications, such as phone calls, video visitation, internet chats, emails, text messages, or the like. In some implementations, controlled-environment facility communications processing system 104 may also be configured to perform communication monitoring operations, such being configured to monitor and or record communication sessions (e.g., as electronic video files).

Thus, in accordance with embodiments of the present systems and methods, a controlled-environment facility communication and/or media device 112, or the like, may include at least one processor and a memory coupled to the at least one processor, such as discussed in greater detail below, with reference to FIG. 3. This memory may be configured to store program instructions executable by the at least one processor. Such program instructions may include a controlled-environment facility communication and/or media device operating system, a controlled-environment facility user interface program, the aforementioned apps, etc. This interface program may include program instructions executable by the at least one processor to cause controlled-environment facility communication and/or media device 112, or the like to run the controlled-environment facility user interface on top of, or as part of, the operating system and present apps available for use by a controlled-environment facility user on the controlled-environment facility communication and/or media device. The interface may act as a controlled-environment facility user communications platform, and also or alternatively, provide automated login for interface applications, etc. The interface may request and accept identification information from the controlled-environment facility user, such as information that may confirm the identity of the user. This identification may be verified, such as through the interface, by controlled-environment facility communications processing system 104 and/or the like, to complete such a login. In accordance with embodiments of the present systems and methods, the interface program instructions may also permit and/or facilitate execution of the apps, such as when one of these apps is selected by the resident, via the displayed interface (134a-c). Further, in accordance with embodiments of the present systems and methods one such app may be a video communications application, such as may facilitate video conferencing or video visitation between a resident and one or more non-residents (or other residents of the same or another controlled-environment facility). As noted, IRD 112, or other similar devices may have video conferencing capabilities, or the like, such as front-facing camera 114 and a microphone, to enable a party to participate in video communication sessions with other call parties. The interface may also countdown a predetermined amount of time the selected app remains active or inactive, a predetermined number of times that an app can be opened, a predetermined number of times that a form can be submitted, a predetermined amount of time an app remains open and/or is executed, a predetermined number of times an app remains open and/or is executed, a multitasking functionality between open apps, etc. Additionally, or alternatively, the interface may enable an app to automatically open, based, for example, on predetermined time values, specific times, or the like.

In accordance with embodiments of the present systems and methods a controlled-environment facility communications system may include controlled-environment facility communication and/or media device(s) (112, or the like), controlled-environment facility communications processing system 104, controlled-environment facility vendor datacenter resident account management system 132, and/or the like. Therein, inward facing connectivity from and to controlled-environment facility communications processing system 104 extends from and to controlled-environment facility resident media devices 112a-112c, such as via wireless access points 116 or 118, Ethernet connectivity and/or the like. These access points may be dedicated wired or wireless access points, such as a WLAN router or the like. Hence, the internal controlled-environment facility connectivity may include WLAN connectivity, and in such embodiments a local area network employing the WLAN connectivity may include wireless access point 116, disposed in corresponding defined area 136a of the controlled-environment facility to provide access by controlled-environment facility resident media devices disposed in that portion of the controlled-environment facility. These specific areas may be monitored and/or controlled in accordance with embodiments of the present systems and methods. Such areas may be any area within the facility that is defined to a location. For example, the areas discussed herein may include a law library, gaming areas, phone call areas, commissary/ordering areas, training/education areas, homework areas, religious areas, etc.

Consentient with the foregoing, where the controlled-environment facility is a correctional facility, a defined video area, or the like, for example, may be established in a portion of the correctional facility, such as a cellblock, a pod, one or more common areas, a laundry room, the yard (outside), one or more dayrooms, the cafeteria, exercise facilities or the like. So, in a correctional facility embodiment, a WLAN may employ wireless access point 116 disposed in area A 136a of correctional facility 102 to provide access by inmate media device 112a, also disposed in area A 136a.

In some embodiments, due to the nature of the construction (e.g., steel, steel-reinforced concrete, or the like) and/or layout (e.g. radiating pod structure, or the like) of a correctional facility, coverage from a particular wireless access point (116), should be contained to the area (136a) where it is installed, and hence only reach controlled-environment facility communication and/or media device(s) (112a) located in that defined area (136a), and be more-or-less isolated from devices (112b and 112c) in other defied areas (136b and 136c), or outside of areas 136a through 136c. Areas may be further defied by taking advantage of, or employing, antenna directionality of wireless access points, signal strength, and/or the like. For example, an authorized transceiver power level may be determined for communicating with the user interface device in response to a request. Additionally, such a system or method may dynamically set a transceiver power in response to the determination. As a further example, a secure network access point may include one or more antennas used for wirelessly communicating with a user interface device, such as the aforementioned personal controlled-environment facility resident communication and/or media devices (112). The one or more antennas may be configured to communicate using a dynamically settable power level. For example, the antenna may be configured to communicate within a first range at a first power level, within a second range at a second power level, and at a third range at a third power level. In addition, the antenna and/or associated RF equipment may be shut off or filtered to terminate communications between the secure network access point and the user interface device. The antenna may be an omnidirectional antenna, a directional antenna, a beam-forming antenna, etc. In some embodiments, the first communication range may be within a few feet of a secure network access point, or even a few inches, requiring the resident to go to a more-or-less or very specific location, such as a communications kiosk, resident phone, classroom, etc. to download and/or stream content or utilize the device. Further security measures may call for determining an authorized duration of network access for the user interface device. Additionally, the method may include establishing a temporary network access session between the user interface device and the network for the authorized duration of network access, and/or temporary access key for network access.

Thus, in accordance with embodiments of the present systems and methods, wireless access point(s) 116 (and/or 118) may be used to establish a particular area in which (select) personal controlled-environment facility resident communication and/or media devices 112 may operate in accordance with embodiments of the present systems and methods. For example, in such embodiments, a range of one or more wireless network access points 116, disposed within illustrated particular area A (136a) and in wireless data communication with personal controlled-environment facility resident communication and/or media device(s) 112a, defines particular area A within illustrated controlled-environment facility 102.

Alternatively, or additionally, in accordance with (other) embodiments of the present systems and methods, (a) respective pair(s) of wireless location points 138a through 138f, in wireless data communication with personal controlled-environment facility resident communication and/or media device(s) 112b or 112c, may define one or more boundaries 140b through 140f of one or more particular (illustrated) areas 136b and/or 136c, within controlled-environment facility 102. For example, with respect to area 136b, a (single) pair of wireless location points 138a and 138b may establish a simulated wall barrier 140b, such as across an opening of a room with three (or less) actual walls, as illustrated for area 136b. Alternatively, or additionally, an entire area, such as (illustrated area 136c may be defined by respective pairs of wireless location points, such as respective pairs of wireless location points 138c and 138d, 138d and 138e, 138e and 138f, and 138f and 138c, defining simulated wall barriers 140c through 140f, respectively, within controlled-environment facility 102. Likewise, in other embodiments an area may be established by one or more wireless location points, or the like acting as beacons establishing an area in accordance with the present systems and methods in a radius around (each of) the wireless location point beacon(s).

Embodiments of the present systems and methods use personal controlled-environment facility resident communication and/or media devices 112, themselves, for regulating and controlling authorized use of the respective personal controlled-environment facility resident communication and/or media devices by device location eligibility within controlled-environment facility 102.

To wit, personal controlled-environment facility resident communication and/or media devices 112 deployed within controlled-environment facility 102 may each determine whether they are authorized to operate in particular areas of the controlled-environment facility (e.g., in a correctional facility, in the inmate's cell, the inmate's pod, library, recreation room, yard, etc., such as described above). Thus, personal controlled-environment facility resident communication and/or media devices may, in accordance with embodiments of the present systems and methods, each determine whether that personal controlled-environment facility resident communication and/or media device is authorized to operate within a particular area (136) within controlled-environment facility 102 that this personal controlled-environment facility resident communication and/or media device is entering or attempting to operate in. Additionally or alternatively, this personal controlled-environment facility resident communication and/or media device may (further) determine whether it is authorized to operate one or more particular application programs (apps) (which may, at the time, be running on the device) or use a device function (e.g., the device camera) within the particular area (136) that the device is entering or attempting to operate in. As detailed further below, this determination may be further based upon a device identification apparatus identified, recognized, or otherwise read by a device identification apparatus interrogator and/or reader 142 disposed within the particular area.

In accordance with embodiments of the present systems and methods, operation of the personal controlled-environment facility resident communication and/or media device (112) may be allowed, by the device, in the particular area (136), in response to a determination, by the device, itself, that it is authorized to operate within that particular area. Likewise, or additionally, or alternatively, (a) particular app(s) or (a) device function(s) operating on the personal controlled-environment facility resident communication and/or media device may also be allowed to operate on the device, in this particular area, (only) in response to a determination that that personal controlled-environment facility resident communication and/or media device is authorized to operate that/those particular app(s) or device function(s) within the particular area, by the device, itself.

Conversely, the respective personal controlled-environment facility resident communication and/or media device (112) may, itself, suspend operation of the device, in response to a determination that the device is not authorized to operate within the particular area. Such suspension of operation (herein) may be accomplished in accordance with embodiments of the present systems and methods by the personal controlled-environment facility resident communication and/or media device, itself, by ceasing operation of the device, blocking operation for the user such as by refusing input by the user, or the like, until such time the device determines it may be used (e.g. in another area of the controlled-environment facility), such as discussed in greater detail below. Likewise, or additionally, or alternatively, the personal controlled-environment facility resident communication and/or media device, itself, may suspend operation of (a) particular app(s) on the device or (a) device function(s), in response to a determination, by the device, that it is not authorized to operate the particular app(s) or device function(s) within the particular area. Such suspension of operation of (a) particular app(s) or device function(s) (herein) by be accomplished by the personal controlled-environment facility resident communication and/or media device ceasing operation of the app(s), blocking the app(s) from the user such as by refusing input by the user, closing the app(s), disabling the device function(s), or the like, until such time the device determines the app(s) or device function(s) may be used (e.g., in another area of the controlled-environment facility), such as also discussed in greater detail below.

Additionally, embodiments of the present systems and methods for authorizing use of personal controlled-environment facility resident communication and/or media devices by device location eligibility may make use of a device identification apparatus, such as an RFID tag or chip, other RFID functionality, an Optical Identification (OID) mechanism, voice biometrics, fingerprint, iris, DNA, or the like, which may be integrated into, attached or otherwise associated with each IRD 112.

A resulting system authorizing use of personal controlled-environment facility resident communication and/or media devices (IRDs 112) by device location eligibility, within the controlled-environment facility 102, for example implementing the process of FIG. 3, below, include the IRDs 112 deployed within the controlled-environment facility having such a device identification apparatus (i.e. an RFID tag, other RFID functionality, an OID mechanism, voice biometrics, fingerprint, iris, DNA, or the like). As one of skill in the art will recognize radio-frequency identification (RFID) uses tags, labels, or other apparatus attached to, or otherwise associated with or incorporated into an object to be identified (referred to generally herein as "RFID tags"). Two-way radio transmitter-receivers called interrogators or readers send a signal to the RFID tag and read its response. RFID tags can be either passive, active or battery-assisted passive. An active RFID tag has an on-board battery and periodically transmits its ID signal. A battery-assisted passive (BAP) RFID tag has a small battery on board and is activated when in the presence of an RFID reader. A passive tag is cheaper and smaller because it has no battery; instead, the tag uses the radio energy transmitted by the reader. Embodiments of the present systems and methods may generally employ passive RFID but may use active and/or BAP RFID. In accordance with embodiments of the present systems and methods active and/or BAP RFID may make use of the power supply (e.g. the battery) of the tagged IRD to power the RFID tag. However, operation of passive RFID may be particularly well suited for use in a controlled-environment facility, such as a correctional facility. That is, the structure of the facility, power and/or directionality of RFID readers/interrogators, and/or the like, may be leveraged, similarly as described above with respect to WLANS.

Hence, device identification apparatus interrogators and/or readers 142a-c (referred to herein individually or collectively as 142), such as RFID interrogators and/or readers, optical bar code readers, or the like may, in certain embodiments, be disposed within one or more of defined areas 136a-c within controlled-environment facility 102. Each device identification apparatus interrogator and/or reader 142 identifies, recognizes, or otherwise reads, the device identification apparatus of IRDs 112 entering or operating in a particular area in which it is disposed. For example, the RFID apparatus may be a passive RFID chip, or the like, disposed in, attached to, or otherwise associated with an IRD. In such cases, the device identification apparatus interrogators and/or readers may be active RFID interrogators, which are each configured to send out an energetic radio signal within (and confined to) the particular defined area in which the particular RFID interrogator is disposed, thereby "illuminating" RFID tags, or the like, of IRDs entering or operating in that particular area. The RFID interrogator should then be able to read a response from any RFID apparatuses of IRDs entering or operating in the particular area. Alternatively, or additionally, in systems where the RFID apparatus is an active RFID chip, the device identification apparatuses may be RFID readers, which are each configured to send out a radio signal, within (and confined to) the particular area in which the particular RFID reader is disposed, to RFID apparatuses of IRDs entering or operating in that particular area. The RFID reader then reads responses from any RFID apparatuses of IRDs entering or operating in that particular area. These device identification apparatus interrogators and/or readers are also coupled to controlled-environment facility communications processing system 104, controlled-environment facility vendor datacenter resident account management system 132, and/or the like, such as via Ethernet connectivity, WLAN connectivity, or the like.

Various embodiments of the present systems and methods may also, mentioned above, employ identification apparatuses, such as an RFID tag, chip, or the like. In such embodiments, each personal controlled-environment facility resident communication and/or media device 112 may include an identification apparatus, such as an RFID tag, chip, or the like. In such embodiments, device identification apparatus interrogators and/or readers 142, or the like, may be disposed within areas 136 defined within the controlled-environment facility 102. These device identification apparatus interrogators and/or readers 142, or the like, may identify, recognize, or otherwise read the device identification apparatus disposed in each personal controlled-environment facility resident communication and/or media device in the respective area 136. In such embodiments, use of a personal controlled-environment facility resident communication and/or media device may also depend upon recognition of the device's identification apparatus by or through device identification apparatus interrogators and/or readers 142.

To wit, operation of a personal controlled-environment facility resident communication and/or media device (112) may (additionally), (only) be allowed by the device, itself, in response to the device identification apparatus interrogator and/or reader (142) disposed within a particular area 136a, b or c recognizing the personal controlled-environment facility resident communication and/or media device as authorized to operate within that particular area. Likewise, or additionally, or alternatively, operation of (a) particular app(s) operating on the device and/or (a) device function(s), may (additionally), (only) be allowed, by the device itself, in response to the device identification apparatus interrogator and/or reader disposed within the particular area recognizing the device as authorized to operate the particular app(s) and/or device function(s) within the particular area.

Conversely, a personal controlled-environment facility resident communication and/or media device (112) may, itself, (additionally) suspend operation of the device, in response to device identification apparatus interrogator and/or reader 142 disposed within the particular area 136 not recognizing the device as authorized to operate within the particular area. Likewise, or additionally, or alternatively, a the personal controlled-environment facility resident communication and/or media device (112) may, itself, (additionally) suspend operation of (a) particular app(s) and/or (a) device function(s), in response to the device identification apparatus interrogator and/or reader 142 disposed within the particular area 136 not recognizing the device as authorized to operate the particular app(s) and/or device function(s) within the particular area.

Additionally, each personal controlled-environment facility resident communication and/or media device 112 may also alert the resident-user of the device that operation of the device is being suspended and/or that operation of the one or more particular apps and/or device functions is suspended, in the particular area. Additionally, or alternatively, personal controlled-environment facility resident communication and/or media devices 112 deployed within controlled-environment facility 102 may alert a user (e.g., a correctional officer in a correctional facility) of at least one personal controlled-environment facility personnel communication and/or media device that operation of the personal controlled-environment facility resident communication and/or media device is suspended and/or operation of the one or more particular apps and/or device functions of the resident device is suspended. Such an alert may identify the particular area in which operation the resident device, app(s) and/or device functions are being suspended, to thereby report where a resident (inmate) is trying to (improperly) use a personal controlled-environment facility resident communication and/or media device. For example, the alert may identify that the resident-user is (improperly) attempting to use a personal controlled-environment facility resident communication and/or media device in an area (i.e., the particular area) which is outside the resident-user's assigned housing area, a (common) area in the facility where general use of devices is generally allowed, and/or the like.

Additionally, or alternatively, personal controlled-environment facility resident communication and/or media devices 112 deployed within controlled-environment facility 102 may each (also) determine whether they are authorized to operate outside of particular areas of the controlled-environment facility (e.g., in a correctional facility, outside the inmate's cell, the inmate's pod, a public area such as a/the library, recreation room, yard, etc.). Thus, in accordance with various embodiments of the present systems and methods, a respective personal controlled-environment facility resident communication and/or media device may (also), itself, (later) determine when that particular personal controlled-environment facility resident communication and/or media device has moved or is moving out of a (e.g., the above-discussed) particular area, in which the device was attempting to operate ((a) certain app(s) and/or (a) device function(s)). In response to the personal controlled-environment facility resident communication and/or media device exiting, and/or attempting to operate outside of, that particular area, the device may, itself, determine whether it is authorized to operate outside the aforementioned particular area (and/or within the controlled-environment facility, generally) and/or whether the device is authorized to operate the particular app(s) and/or device function(s) outside the particular area (and/or within the controlled-environment facility, generally).

However, first, when the personal controlled-environment facility resident communication and/or media device is close to moving outside an authorized area, the device may provide the resident-user, and/or facility personnel, a notification that the device is moving out of the area it is authorized to operate in, or the like. This notification to the resident-user may include visual notification to the user when the device is getting close to a boundary of the area it is allowed to operate in. The notification may include, by way of example, display of text, banners, or the like, of different colors (e.g., green, yellow, red.) as the device operates in the area, moves toward the boundary and/or begins to cross a boundary. Also, audio alerts, vibration (of the device), or the like, may be utilized in conjunction with such notification that the device is moving out of the area it is authorized to operate in.

In accordance with such embodiments, the personal controlled-environment facility resident communication and/or media device may be allowed to operate in response to a determination, by the device itself, that the device is exiting or outside of the particular area and in response to a determination that the personal controlled-environment facility resident communication and/or media device is authorized to operate outside the particular area (and/or within the controlled-environment facility, generally). Likewise, or additionally, or alternatively, operation of the particular app(s) operating on the device and/or device function(s) may be allowed, in response to a determination that device is exiting or outside of the particular area, and in response to a determination that the device is authorized to operate the particular app(s) and/or device function(s) outside the particular area (and/or within the controlled-environment facility, generally).

Conversely, but also in accordance with such embodiments of the present systems and methods, operation of the device may be suspended, by the device itself, in response to a determination that the personal controlled-environment facility resident communication and/or media device is not authorized to operate outside the particular area (e.g., not authorized to operate in areas of the controlled-environment facility, generally, other than the above-discussed particular area(s)). Likewise, or additionally, or alternatively, operation of the particular app(s) and/or device function(s) may be suspended, in response to a determination that the personal controlled-environment facility resident communication and/or media device is not authorized to operate the particular app(s) and/or device function(s) outside the particular area (e.g., not authorized to operate in areas of the controlled-environment facility, generally, other than the above-discussed particular area(s)).

Additionally, as discussed above, each personal controlled-environment facility resident communication and/or media device 112 may include an identification apparatus, such as an RFID tag, chip, or the like. In such embodiments, device identification apparatus interrogators and/or readers 142, or the like, may be disposed within areas 136 defined within the controlled-environment facility 102. These device identification apparatus interrogators and/or readers 142, or the like, may identify, recognize, or otherwise read the device identification apparatus disposed in each personal controlled-environment facility resident communication and/or media device in the respective area 136. In such embodiments, use of a personal controlled-environment facility resident communication and/or media device may also depend upon the device, as recognized by or through device identification apparatus interrogators and/or readers 142, not be forbidden from operating in, operating certain apps in, and/or using certain device functions in the interrogator's area.

To wit, in accordance with such embodiments of the present systems and methods, operation of a personal controlled-environment facility resident communication and/or media device may be allowed, by the device itself, in response to the device identification apparatus interrogator and/or reader disposed within the particular area (also) not recognizing the device as within the particular area. Likewise, or additionally, or alternatively, operation of (a) particular app(s) operating on a personal controlled-environment facility resident communication and/or media device and/or (a) device function(s) may be allowed by that device, itself, in response to the device identification apparatus interrogator and/or reader disposed within a particular area (also) not recognizing the personal controlled-environment facility resident communication and/or media device as within the particular area.

Conversely, in accordance with such embodiments of the present systems and methods, operation of a personal controlled-environment facility resident communication and/or media device may be suspended, by the device itself, in response to the device identification apparatus interrogator and/or reader disposed within the particular area (also) recognizing the personal controlled-environment facility resident communication and/or media device as within the particular area. Likewise, or additionally, or alternatively, operation of (a) particular app(s) operating on a personal controlled-environment facility resident communication and/or media device and/or (a) device function(s) may be suspended, by the device, itself, in response to the device identification apparatus interrogator and/or reader disposed within the particular area (also) recognizing the device as within the particular area.

FIG. 2 is a flowchart of example process 200 for authorizing use of personal controlled-environment facility resident communication and/or media devices (112) by device location eligibility, in accordance with some embodiments of the present systems and methods. Therein, at 205, a personal controlled-environment facility resident communication and/or media device may determine whether the device, itself, is authorized to operate within a particular area (136) within the controlled-environment facility (102) that the device is entering or attempting to operate in and/or authorized to operate (a) particular app(s) within the particular area.

At 210, operation of the personal controlled-environment facility resident communication and/or media device (112), and/or the particular app(s) operating on the device, are allowed by the device, itself, in response to a determination at 205 that the device is authorized to operate within the particular area (136) and/or the device is authorized to operate the app(s) within the particular area within the controlled-environment facility.

At 215, the personal controlled-environment facility resident communication and/or media device suspends operation of (at least some functions of) the device and/or the particular app(s) operating on the device, in response to a determination at 205 that the device is not authorized to operate within the particular area within the controlled-environment facility. Further in this regard, the resident-user may be alerted that this suspension of operation of the device, particular apps and/or device functions in the particular area is taking place, and/or the resident device may alert (a) personal controlled-environment facility personnel (e.g., correctional officer) communication and/or media device(s) that operation of the personal controlled-environment facility resident communication and/or media device is suspended and/or operation of the one or more particular apps and/or device functions of the resident device is suspended. Such an alert may identify the particular area in which operation the resident device, app(s) and/or device functions are being suspended, to thereby report where a resident (inmate) is trying to (improperly) use a personal controlled-environment facility resident communication and/or media device. Such an alert to facility personnel may identify that the resident-user is (improperly) attempting to use the personal controlled-environment facility resident communication and/or media device in an area (i.e., the particular area) that is not a (common) area in the facility where general use of devices is generally allowed, outside the resident-user's assigned housing area, and/or the like.

At 220, the personal controlled-environment facility resident communication and/or media device (112) may determine, when the particular personal controlled-environment facility resident communication and/or media device moves out of the particular area (136), and/or is attempting to operate outside the particular area. Further in this regard, when the resident-user is close to moving outside an authorized area, the personal controlled-environment facility resident communication and/or media device may provide the user a notification, and/or to facility personnel, that the device is moving out of the area it is authorized to operate in, or the like. These notifications may include visual notifications to the user when they are (the device is) getting close to the boundaries, such as display of text, banners, or the like of different colors (e.g., green, yellow, red.) as they operate in the area, move toward boundaries and/or begin to cross a boundary. Further audio alerts, vibration (of the device), or the like may also be utilized in conjunction with such notification that the device is moving out of the area it is authorized to operate in.

At 225, the personal controlled-environment facility resident communication and/or media device (112) may determine, such as in response to the device exiting or attempting to operate outside of the particular area (136), such as determined at 220, whether the device is authorized to operate outside the particular area, but still within the controlled-environment facility (102) and/or authorized to operate the particular app(s) outside the particular area, but still within the controlled-environment facility (102).

At 230, the personal controlled-environment facility resident communication and/or media device (112) allows operation of the device, and/or the particular app(s) operating on the device, in response to a determination at 220 that the device is exiting or outside of the particular area (136) and in response to a determination at 225 that the device is authorized to operate outside the particular area, and/or the device is authorized to operate the app(s) outside the particular area within the controlled-environment facility.

At 235, the personal controlled-environment facility resident communication and/or media device suspends operation of the device, and/or operation of the particular app(s) on the device, in response to a determination at 220 that the device is not authorized to operate outside the particular area, and/or the device is not authorized to operate the one or more particular apps outside the particular area.

FIG. 3 is a flowchart of further example process 300 for further authorizing use of personal controlled-environment facility resident communication and/or media devices (112) by device location eligibility, in accordance with some embodiments of the present systems and methods. Further to the device determining authorization to operate in a particular controlled-environment facility area (205) and allowing (210) or suspending (215) operation of the device, at least one device identification apparatus interrogator and/or reader within the particular area may, at 305 identify, recognize, or otherwise read, device identification apparatuses of personal controlled-environment facility resident communication and/or media devices in that particular area.

At 310, a respective personal controlled-environment facility resident communication and/or media device (112) may allow operation of the respective device, and/or operation of (a) particular app(s) operating on the respective device, in response to allowing operation at 210, and in response to the device identification apparatus interrogator and/or reader (142) disposed within the particular area (136) recognizing the respective device as authorized to operate within the particular area.

Alternatively, at 315, the respective personal controlled-environment facility resident communication and/or media device (112) may suspend operation of the device, and/or operation of the particular app(s) operating on the respective device, in response to suspending operation at 215, and in response to the device identification apparatus interrogator and/or reader (136) disposed within the particular area (136) not recognizing the device as authorized to operate within the particular area.

FIG. 4 is a flowchart of further example process 400 for further authorizing use of personal controlled-environment facility resident communication and/or media devices (112) by device location eligibility, in accordance with some embodiments of the present systems and methods. Further to the device determining authorization to operate outside a particular controlled-environment facility area (220 and 225) and allowing (230) or suspending (235) operation of the device, at least one device identification apparatus interrogator and/or reader within the particular area may, at 405 identify, recognize, or otherwise read, device identification apparatuses of personal controlled-environment facility resident communication and/or media devices as in that particular area.

At 410, the respective personal controlled-environment facility resident communication and/or media device (112), allows operation of the device, and/or operation of the particular app(s) operating on the respective device, in response to allowing operation at 230, and in response to the device identification apparatus interrogator and/or reader (142) disposed within the particular area (136) not recognizing the device as within the particular area.

Alternatively, at 415, the respective personal controlled-environment facility resident communication and/or media device (112) may suspend operation of the device, and/or operation of the particular app(s) operating on the respective device, in response to suspending operation at 235, and/or in response to the device identification apparatus interrogator and/or reader (142) disposed within the particular area (136) recognizing the personal controlled-environment facility resident communication and/or media device as within the particular area.

Prior to processes 200 through 400, described above, with respect to flowchart FIGS. 2 through 4, embodiments of the present systems and methods may be set-up by defining at least one particular area (136) within the controlled-environment facility (102) by a range of at least one wireless network access point (116) disposed in the particular area and via wireless data communication with the personal controlled-environment facility resident communication and/or media devices (112), therein. Alternatively, or additionally, also prior to processes 200 through 400, described above, with respect to flowchart FIGS. 2 through 4, embodiments of the present systems and methods may be set-up by defining at least one boundary (140b through 140f) of at least one particular area within the controlled-environment facility using a respective pair of wireless location points (138a through 138f) in wireless data communication with the personal controlled-environment facility resident communication and/or media device to define each boundary.

Various elements of the present systems and methods for authorized use of personal controlled-environment facility resident communication and/or media devices by device location eligibility, as described herein, may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Embodiments of the present systems and methods for authorized use of personal controlled-environment facility resident communication and/or media devices by device location eligibility, as described herein, may be implemented or executed, at least in part, by one or more computer systems. One such computer system is illustrated in FIG. 5. In various embodiments, computer system 500 may be a server, a mainframe computer system, a workstation, a network computer, a desktop computer, a laptop, a tablet computing device, media player, or the like. For example, in some cases, computer 500 may implement one or more steps of example processes 200 through 400 described above with respect to FIGS. 2 through 4, and/or a computer system such as computer system 500 may be used as part of, one or more of, controlled-environment facility communications processing system 104, IRD 112, controlled environment facility vendor datacenter 106, resident account management system 132, and/or the like. In various embodiments two or more of these computer systems may be configured to communicate with each other in any suitable way, such as, for example, via a network (e.g., in FIG. 1, device 112 is illustrated as wirelessly communicating using wireless functionality).

As illustrated, computer system 500 includes one or more processors 510A-N coupled to a system memory 520 via bus 530. Computer system 500 further includes a network interface 540 coupled to bus 530, and one or more I/O controllers 550, which in turn are coupled to peripheral devices such as cursor control device 560, keyboard 570, display(s) 580, etc. Each of I/O devices 560, 570, 580 may be capable of communicating with I/O controllers 550, for example, via a wired connection (e.g., serial port, Universal Serial Bus port) or wireless connection (e.g., Wi-Fi, Bluetooth, Near-Field Communications Link, etc.). Other devices may include, for example, microphones, antennas/wireless transducers, phone detection modules, etc.

In various embodiments, computer system 500 may be a single-processor system including one processor 510A, or a multi-processor system including two or more processors 510A-N (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or another dedicated graphics-rendering device.

System memory 520 may be configured to store program instructions and/or data accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 520 as program instructions 525 and data storage 535, respectively. In other embodiments, program instructions and/or data may be received, sent, or stored upon different types of computer-accessible media or on similar media separate from system memory 520 or computer system 500.

A computer-accessible medium may include any tangible and/or non-transitory storage media or memory media such as electronic, magnetic, or optical media—e.g., disk or CD/DVD-ROM coupled to computer system 500 via bus 530. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 530 may be configured to coordinate I/O traffic between processor 510, system memory 520, and any peripheral devices in the computer system, including network interface 540 or other peripheral interfaces, such as I/O devices 560, 570, 580. In some embodiments, bus 530 may perform any necessary protocol, timing, or other data transformations to convert data signals from one component (e.g., system memory 520) into a format suitable for use by another component (e.g., processor 510). In some embodiments, bus 530 may include support for devices attached through various types of peripheral buses, such as a variant of the Peripheral Component Interconnect (PCI) bus standard or the Universal Serial Bus (USB) standard, for example. In some embodiments, the function of bus 530 may be split into two or more separate components, such as a northbridge chipset and a southbridge chipset, for example. In addition, in some embodiments some or all the functionality of bus 530, such as an interface to system memory 520, may be incorporated directly into processor(s) 510A-N.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 550 may, in some embodiments, enable communications with one or more display terminals, keyboards, keypads, touchpads, scanning devices, voice or optical recognition devices, mobile devices, or any other devices suitable for entering or retrieving data by one or more computer system 500. Multiple I/O controllers 550 may be present in computer system 500 or may be distributed on various nodes of computer system 500. In some embodiments, I/O devices may be separate from computer system 500 and may interact with one or more nodes of computer system 500 through a wired or wireless connection, such as over network interface 540.

As shown in FIG. 5, system memory 520 may include program instructions 525, configured to implement certain embodiments described herein, and data storage 535, comprising various data may be accessible by program instructions 525. In an embodiment, program instructions 525 may include software elements, which may be configured to affect the operations discussed in FIGS. 1 through 4. Program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 5, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for authorized use of personal controlled-environment facility resident communication and/or media devices by device location eligibility within a controlled-environment facility, the system comprising:
   one or more personal controlled-environment facility resident communication and/or media devices deployed within a controlled-environment facility, each personal controlled-environment facility resident communication and/or media device comprising an identification apparatus; and
   identification apparatus interrogators and/or readers, each disposed within an area defined within the controlled-environment facility and configured to identify, recognize, or otherwise read the identification apparatus;
   each personal controlled-environment facility resident communication and/or media device configured to:
      determine whether the personal controlled-environment facility resident communication and/or media device is within a particular area within the controlled-environment facility;
      allow operation of the personal controlled-environment facility resident communication and/or media device, in response to the identification apparatus interrogator and/or reader disposed within the particular area not recognizing the personal controlled-environment facility resident communication and/or media device as within the particular area;
      allow operation of one or more particular application programs and/or device functions operating on the personal controlled-environment facility resident communication and/or media device, in response to the identification apparatus interrogator and/or reader disposed within the particular area not recognizing the personal controlled-environment facility resident communication and/or media device as within the particular area;
      suspend operation, in response to the identification apparatus interrogator and/or reader disposed within the particular area recognizing the personal controlled-environment facility resident communication and/or media device as within the particular area; and
      suspend operation of the one or more particular application programs and/or device functions, in response to the identification apparatus interrogator and/or reader disposed within the particular area recognizing the personal controlled-environment facility resident communication and/or media device as within the particular area.

2. The system of claim 1, wherein each personal controlled-environment facility resident communication and/or media device is further configured to:
   determine when the personal controlled-environment facility resident communication and/or media device moves out of the particular area;
   determine, in response to the personal controlled-environment facility resident communication and/or media device exiting or attempting to operate outside of the particular area, whether the personal controlled-environment facility resident communication and/or media device is authorized to operate outside the particular area within the controlled-environment facility and/or authorized to operate one or more particular application programs and/or device functions outside the particular area within the controlled-environment facility;
   allow the operation of the personal controlled-environment facility resident communication and/or media device, in response to a determination that the personal controlled-environment facility resident communication and/or media device is exiting or outside of the particular area and in response to a determination that the personal controlled-environment facility resident communication and/or media device is authorized to operate outside the particular area within the controlled-environment facility;
   allow the operation of the one or more particular application programs and/or device functions operating on the personal controlled-environment facility resident communication and/or media device, in response to a determination that the personal controlled-environment facility resident communication and/or media device is exiting or outside of the particular area and in response to a determination that the personal controlled-environment facility resident communication and/or media device is authorized to operate the one or more particular application programs and/or device functions outside the particular area within the controlled-environment facility;
   suspend operation, in response to a determination that the personal controlled-environment facility resident communication and/or media device is not authorized to operate outside the particular area within the controlled-environment facility; and suspend operation of the one or more particular application programs and/or device functions, in response to a determination that the personal controlled-environment facility resident communication and/or media device is not authorized to operate the one or more particular application programs and/or device functions outside the particular area within the controlled-environment facility.

3. The system of claim 1, further comprising one or more wireless network access points in wireless data communication with the personal controlled-environment facility resident communication and/or media device, a range of each of at least some of the wireless network access points defining one particular area within the controlled-environment facility.

4. The system of claim 1, further comprising one or more respective pairs of wireless location points in wireless data communication with the personal controlled-environment facility resident communication and/or media device, each respective pair of wireless location points defining a boundary of one particular area within the controlled-environment facility.

5. The system of claim 1, wherein the personal controlled-environment facility resident communication and/or media device is further configured to:

allow the operation of the personal controlled-environment facility resident communication and/or media device, in response to the identification apparatus interrogator and/or reader disposed within the particular area recognizing the personal controlled-environment facility resident communication and/or media device as authorized to operate within the particular area;

allow the operation of one or more particular application programs and/or device functions operating on the personal controlled-environment facility resident communication and/or media device, in response to the identification apparatus interrogator and/or reader disposed within the particular area recognizing the personal controlled-environment facility resident communication and/or media device as authorized to operate the one or more particular application programs and/or device functions within the particular area;

suspend the operation, in response to the identification apparatus interrogator and/or reader disposed within the particular area not recognizing the personal controlled-environment facility resident communication and/or media device as authorized to operate within the particular area; and suspend the operation of the one or more particular application programs and/or device functions, in response to the identification apparatus interrogator and/or reader disposed within the particular area not recognizing the personal controlled-environment facility resident communication and/or media device as authorized to operate the one or more particular application programs and/or device functions within the particular area.

6. The system of claim 1, wherein each personal controlled-environment facility resident communication and/or media device is further configured to alert a user of the personal controlled-environment facility resident communication and/or media device that operation of the personal controlled-environment facility resident communication and/or media device is being suspended and/or operation of the one or more particular application programs and/or device functions is suspended.

7. The system of claim 1, wherein each personal controlled-environment facility resident communication and/or media device is further configured to alert a user of at least one personal controlled-environment facility personnel communication and/or media device that operation of the personal controlled-environment facility resident communication and/or media device is suspended and/or operation of the one or more particular application programs and/or device functions of the personal controlled-environment facility resident communication and/or media device is suspended.

8. The system of claim 7, wherein the alert identifies the particular area.

9. A method for authorizing use of personal controlled-environment facility resident communication and/or media devices by device location eligibility within a controlled-environment facility, the method comprising:

disposing at least one identification apparatus interrogator and/or reader within at least one area defined within the controlled-environment facility;

identifying, recognizing, or otherwise reading, by at least one identification apparatus interrogator and/or reader disposed in a particular area within the controlled-environment facility, identification apparatuses of personal controlled-environment facility resident communication and/or media devices in the particular area;

determining, by a personal controlled-environment facility resident communication and/or media device, whether the personal controlled-environment facility resident communication and/or media device is within the particular area;

allowing operation of the personal controlled-environment facility resident communication and/or media device, by the personal controlled-environment facility resident communication and/or media device, in response to the identification apparatus interrogator and/or reader disposed within the particular area not recognizing the personal controlled-environment facility resident communication and/or media device as within the particular area;

allowing, by the personal controlled-environment facility resident communication and/or media device, operation of one or more particular application programs and/or device functions operating on the personal controlled-environment facility resident communication and/or media device, in response to the identification apparatus interrogator and/or reader disposed within the particular area not recognizing the personal controlled-environment facility resident communication and/or media device as within the particular area;

suspending operation of the personal controlled-environment facility resident communication and/or media device, by the personal controlled-environment facility resident communication and/or media device, in response to the identification apparatus interrogator and/or reader disposed within the particular area recognizing the personal controlled-environment facility resident communication and/or media device as within the particular area; and suspending operation of the one or more particular application programs and/or device functions on the personal controlled-environment facility resident communication and/or media device, by the personal controlled-environment facility resident communication and/or media device, in response to the identification apparatus interrogator and/or reader disposed within the particular area recognizing the personal controlled-environment facility resident communication and/or media device as within the particular area.

10. The method of claim 9, further comprising:
determining, by the personal controlled-environment facility resident communication and/or media device, when the personal controlled-environment facility resident communication and/or media device moves out of the particular area;
determining, by the personal controlled-environment facility resident communication and/or media device, in response to the personal controlled-environment facility resident communication and/or media device exiting or attempting to operate outside of the particular area, whether the personal controlled-environment facility resident communication and/or media device is authorized to operate outside the particular area within the controlled-environment facility and/or authorized to operate one or more particular application programs and/or device functions outside the particular area within the controlled-environment facility;
allowing, by the personal controlled-environment facility resident communication and/or media device, the operation of the personal controlled-environment facility resident communication and/or media device, in response to a determination that the personal controlled-environment facility resident communication and/or media device is exiting or outside of the particular area and in response to a determination that the personal controlled-environment facility resident communication and/or media device is authorized to operate outside the particular area within the controlled-environment facility;
allowing, by the personal controlled-environment facility resident communication and/or media device, the operation of the one or more particular application programs and/or device functions operating on the personal controlled-environment facility resident communication and/or media device, in response to a determination that the personal controlled-environment facility resident communication and/or media device is exiting or outside of the particular area and in response to a determination that the personal controlled-environment facility resident communication and/or media device is authorized to operate the one or more particular application programs and/or device functions outside the particular area within the controlled-environment facility;
suspending operation of the personal controlled-environment facility resident communication and/or media device, by the personal controlled-environment facility resident communication and/or media device, in response to a determination that the personal controlled-environment facility resident communication and/or media device is not authorized to operate outside the particular area within the controlled-environment facility; and
suspending operation of the one or more particular application programs and/or device functions on the personal controlled-environment facility resident communication and/or media device, by the personal controlled-environment facility resident communication and/or media device, in response to a determination that the personal controlled-environment facility resident communication and/or media device is not authorized to operate the one or more particular application programs and/or device functions outside the particular area within the controlled-environment facility.

11. The method of claim 9, further comprising defining at least one particular area within the controlled-environment facility by a range of at least one wireless network access point in wireless data communication with the personal controlled-environment facility resident communication and/or media device.

12. The method of claim 9, further comprising defining at least one boundary of at least one particular area within the controlled-environment facility using a respective pair of wireless location points in wireless data communication with the personal controlled-environment facility resident communication and/or media device to define each boundary.

13. The method of claim 9 further comprising:
allowing the operation of the personal controlled-environment facility resident communication and/or media device, by the personal controlled-environment facility resident communication and/or media device, in response to the identification apparatus interrogator and/or reader disposed within the particular area recognizing the personal controlled-environment facility resident communication and/or media device as authorized to operate within the particular area;
allowing the operation of one or more particular application programs and/or device functions operating on the personal controlled-environment facility resident communication and/or media device, by the personal controlled-environment facility resident communication and/or media device, in response to the identification apparatus interrogator and/or reader disposed within the particular area recognizing the personal controlled-environment facility resident communication and/or media device as authorized to operate the one or more particular application programs and/or device functions within the particular area;
suspending the operation, of the personal controlled-environment facility resident communication and/or media device, by the personal controlled-environment facility resident communication and/or media device, in response to the identification apparatus interrogator and/or reader disposed within the particular area not recognizing the personal controlled-environment facility resident communication and/or media device as authorized to operate within the particular area; and
suspending the operation of the one or more particular application programs and/or device functions, by the personal controlled-environment facility resident communication and/or media device, in response to the identification apparatus interrogator and/or reader disposed within the particular area not recognizing the personal controlled-environment facility resident communication and/or media device as authorized to operate the one or more particular application programs and/or device functions within the particular area.

14. The method of claim 9, further comprising alerting a user of the personal controlled-environment facility resident communication and/or media device that operation of the personal controlled-environment facility resident communication and/or media device is being suspended and/or operation of the one or more particular application programs and/or device functions is suspended.

15. The method of claim 9, further comprising alerting a user of at least one personal controlled-environment facility personnel communication and/or media device that operation of the personal controlled-environment facility resident communication and/or media device is suspended and/or operation of the one or more particular application programs and/or device functions of the personal controlled-environment facility resident communication and/or media device is suspended.

16. The method of claim 15, wherein alerting the user of the least one personal controlled-environment facility personnel communication and/or media device further comprises identifying the particular area.

17. A non-transitory computer-readable storage medium having program instructions stored thereon that, upon execution by a personal controlled-environment facility resident communication and/or media device comprising an identification apparatus, cause the personal controlled-environment facility resident communication and/or media device to:
   determine whether the personal controlled-environment facility resident communication and/or media device is within a particular area within the controlled-environment facility;
   allow operation of the personal controlled-environment facility resident communication and/or media device, in response to an identification apparatus interrogator and/or reader disposed within the particular area, and configured to identify, recognize, or otherwise read the identification apparatus, not recognizing the personal controlled-environment facility resident communication and/or media device as within the particular area;
   allow operation of one or more particular application programs and/or device functions operating on the personal controlled-environment facility resident communication and/or media device, in response to the identification apparatus interrogator and/or reader not recognizing the personal controlled-environment facility resident communication and/or media device as within the particular area;
   suspend operation, in response to the identification apparatus interrogator and/or reader recognizing the personal controlled-environment facility resident communication and/or media device as within the particular area; and
   suspend operation of the one or more particular application programs and/or device functions, in response to the identification apparatus interrogator and/or reader recognizing the personal controlled-environment facility resident communication and/or media device as within the particular area.

18. The non-transitory computer-readable storage medium of claim 17, wherein, upon execution, the program instructions further, cause the personal controlled-environment facility resident communication and/or media device to:
   determine when the personal controlled-environment facility resident communication and/or media device moves out of the particular area;
   determine, in response to the personal controlled-environment facility resident communication and/or media device exiting or attempting to operate outside of the particular area, whether the personal controlled-environment facility resident communication and/or media device is authorized to operate outside the particular area within the controlled-environment facility and/or authorized to operate one or more particular application programs and/or device functions outside the particular area within the controlled-environment facility;
   allow the operation of the personal controlled-environment facility resident communication and/or media device, in response to a determination that the personal controlled-environment facility resident communication and/or media device is exiting or outside of the particular area and in response to a determination that the personal controlled-environment facility resident communication and/or media device is authorized to operate outside the particular area within the controlled-environment facility;
   allow the operation of the one or more particular application programs and/or device functions operating on the personal controlled-environment facility resident communication and/or media device, in response to a determination that the personal controlled-environment facility resident communication and/or media device is exiting or outside of the particular area and in response to a determination that the personal controlled-environment facility resident communication and/or media device is authorized to operate the one or more particular application programs and/or device functions outside the particular area within the controlled-environment facility;
   suspend operation, in response to a determination that the personal controlled-environment facility resident communication and/or media device is not authorized to operate outside the particular area within the controlled-environment facility; and
   suspend operation of the one or more particular application programs and/or device functions, in response to a determination that the personal controlled-environment facility resident communication and/or media device is not authorized to operate the one or more particular application programs and/or device functions outside the particular area within the controlled-environment facility.

* * * * *